Patented Apr. 8, 1941

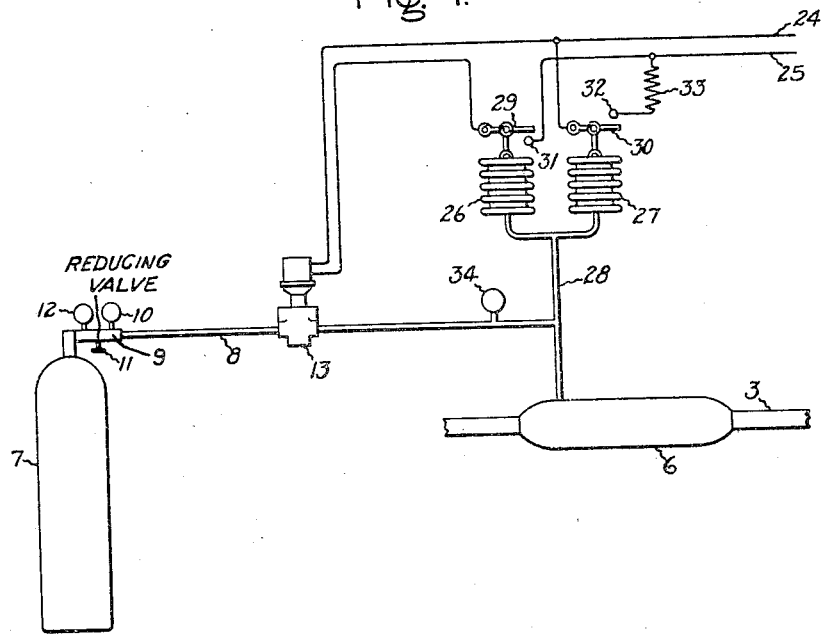

2,237,803

UNITED STATES PATENT OFFICE 2,237,803

CONTROL MEANS FOR GAS FILLED CABLES

Stephen Zysk, Schenectady, N. Y., assignor to General Electric Company, a corporation of New York Application January 17, 1939, Serial No. 251,377

6 Claims. (Cl. 174—11)

The present invention relates to cables for transmitting electric power of the type having a gas feed channel in which the pressure of the gas therein must be controlled within relatively narrow limits. In such cable systems, the gas is supplied to the cable by rigid wall tanks in which the pressure is substantially higher than can safely be used with cables having the usual type of unarmored lead sheaths. As a result of this, the pressure of the gas admitted to the cable from the tank must be reduced, for example, to a maximum of 15 pounds pressure per square inch, and must be so controlled that the pressure never drops below that of the atmosphere, and desirably not below a few pounds above atmosphere. Under normal operating conditions of the cable, the flow of gas from the tanks may be nil or at least of small amount. However, if a defect occurs in the cable sheath, in the joint casings or other enclosing parts permitting gas to escape to atmosphere, the supply of gas from the tank must be increased by an amount corresponding to the leakage to take care of such leakage and also to maintain the predetermined minimum pressure within the sheath and other enclosing parts.

The object of my invention is the provision of improved means for controlling the admission of gas, from a source of high pressure gas, to the feed channel of a gas filled cable which operates under a lower positive pressure.

For a consideration of what I believe to be novel and my invention, attention is directed to the accompanying description and the claims appended thereto.

The drawing attached hereto is illustrative of my invention in which Fig. 1 is a diagrammatic view of a part of a gas filled cable system; Fig. 2 is a sectional view of an electrically controlled valve for the supply of gas to the cable, and Fig. 3 is a cross-sectional view of the cable.

Referring to Figs. 1 and 3, 3 indicates a gas filled cable having a lead sheath 4 and a suitable feed channel or channels 5 for the gas. The channels 5 are located in the spaces between adjacent insulated conductors and directly under the sheath 4. The specific construction of the cable is not material to an understanding of my invention. 6 indicates the casing surrounding the joint or joints between lengths of cable. Such casing may be made of lead or other suitable material and is secured at its ends to the cable sheaths by wipe soldered joints as is customary in cable installations. Such gas filled cables normally operate at a pressure of from 7 to 15 pounds per square inch although not necessarily limited to such pressures. 7 indicates a rigid wall tank containing insulating gas which, for example, may be nitrogen or other suitable insulating gas. It is contemplated that the tanks shall be initially charged with gas under 2000 pounds pressure per square inch. This pressure is given merely as an example and not as a limitation of my invention, the point being that the gas pressure within the tank is materially higher than can be used in the cable, also that the quantity of gas in the tank is sufficient to take care of the requirements of the cable over a relatively long period of time even though one or more leaks develop in the section of cable supplied by the tank.

The gas tank may be connected to the cable in any suitable way which will permit of feeding gas under pressure thereto, as for example to the channels thereof. As illustrated, gas is conveyed by the pipe or conduit 8 to the joint casing 6 enclosing the conductor connectors and the open ends of the gas feed channels 5. Connected to the tank is a pressure reducing device or regulator 9 by means of which the pressure of the gas in the tank may be reduced to that available for use in the cable. The high pressure in the tank is indicated by the pressure gauge 12. The reduced pressure is indicated by the pressure gauge 10. The regulator may be of any suitable or usual construction such as are available in the market, hence detail description thereof appears to be unnecessary. The pressure required may be obtained by operating the regulator handle 11.

In the pipe line 8 is a valve 13 which is responsive in its action to the pressure of the gas in the cable. It may be of any suitable or known construction. As shown, in Fig. 2, it comprises a casing 14 containing a valve 15 which is actuated by a diaphragm 16 and a restoring compression spring 17. Above the diaphragm is a small needle or pilot valve 18 that is opened and closed in response to the action of a solenoid magnet 19. When the magnet is deenergized, the pilot valve closes by gravity or equivalent means and when energized, the valve opens. Assuming the magnet to be energized and valve open, gas flows through ports 20 and 21 to the upper side of the diaphragm causing the latter to open valve 15 against the action of the closing spring 17. When the pilot valve 18 closes, the spring 17 seats the valve and the gas in the chamber above the diaphragm flows slowly through the leak port 22 subject to the control of a pre-adjusted valve 23. Current is supplied to the magnet winding by the low voltage lines 24 and 25 connected to a suitable source of current supply. These lines may also serve to actuate a signal in the current supply station or other point when desired.

Since the supply of gas to the cable under the conditions outlined must be responsive to the maximum as well as the minimum pressure conditions within the cable, two pressure responsive devices 26 and 27 are provided in the form of bellows diaphragms, the bellows 26 responding to decreasing or minimum pressure and the bellows 27 to increasing or maximum pressure. The bellows are connected to the pipe line 8 by branch pipe 28 and hence both are responsive to the gas pressure in the cable. Each of the bellows actuates a switch which for convenience and simplicity are diagrammatically illustrated at 29 and 30. When bellows 26 contracts, it permits the switch blade 29 and contact 31 to engage and thus close the circuit and energize the solenoid magnet. The closing of this circuit causes the valve 15 to open and to permit gas to flow from the tank to the cable. When the pressure in the cable begins increasing, both bellows 26 and 27 expand. The expansion of bellows 26 opens the contacts 29 and 31. The expansion of bellows 27 moves switch blade 30 into contact with 32 and completes the circuit for ringing the alarm back in the station. If the bellows 26 accidentally fails to expand or accidentally fails to break the contact between switch blade 29 and contact 31, the valve 15, Fig. 2, would tend to open, thus giving more pressure to the cable which already has too high a pressure. However, as bellows 27 expands and closes switch member 30 with contact 32, the resistance 33, which has the effect of shutting off the supply of current to the solenoid magnet by shunting it, is put into the circuit, thus permitting the pilot valve 18 to seat and the valve 15 to close. The resistance 33 which is in series with the maximum pressure switch means is equal or substantially equal to the resistance of the magnet of the solenoid valve. The control circuit 24, 25 is desirably connected to an alarm device at a control point. If either maximum or minimum pressure control contacts are closed, a flow of current results sufficient to operate an alarm and appropriate action may thereafter be taken. The resistance 33 gives a balanced circuit for operating the alarm device. Ordinarily, it will be desirable to have the switches operate with a snap action to prevent arcing at the contact surfaces. Such switches are well known. In the pipe 8 is also a safety valve 34 set to open at a predetermined pressure which desirably is a little higher than the cable pressure. This will protect the sheath against injury.

The solenoid actuated valve 15 is normally closed, and the switches 29 and 30 are normally in open position. One set of switch members or parts is calibrated to close when the gas pressure of the cable reaches the maximum value, and the other set of switch members or parts is calibrated to close when the gas pressure falls to the minimum predetermined value. The contacts which close at the maximum cable pressure open automatically when the pressure is reduced to a safe predetermined value. The contacts which close at the minimum cable pressure open when the pressure is restored to a safe predetermined value. With the pressure reducing valve or regulator 9 preset for a safe gas pressure and valve 15 open, gas will enter the cable until the pressure therein is increased up to the point at which the minimum pressure contacts of the gas pressure relay open again, and the solenoid actuated valve will close. As the gas pressure in the cable decreases due to leakage, the gas pressure therein will automatically be restored by repeated action of the bellows diaphragms 26 and 27 and the switches controlled thereby.

I have illustrated my invention in connection with a magnetically operated valve because such valves are simple in construction and reliable in operation but in its broader aspects my invention contemplates the use of other types of valves which are controllable in response to changes of pressure of the gas within the cable.

What I claim as new and desire to secure by Letters Patent of the United States is:

1. A power cable system comprising conductors, insulation thereon, an enclosing sheath for the conductors, a channel within the sheath containing an insulating gas under predetermined positive pressure to assist in insulating the conductors, a tank containing at all times a supply of said gas under relatively high pressure, a pipe receiving gas from the tank and supplying it to the interior of the sheath, a regulator for reducing the pressure of the gas flowing from the tank to that of the predetermined gas pressure within the cable sheath, an intermittently acting, normally closed shut-off valve located in the pipe between the regulator and the cable, a first means responsive to predetermined changes of gas pressure within the sheath and channel for normally opening and closing the valve, and a second means responsive to a higher than normal gas pressure within the sheath and channel which assumes control of and shuts the valve when for any reason the first means fails to do so.

2. A power cable system comprising conductors, insulation thereon, an enclosing sheath for the conductors, a longitudinally extending channel within the sheath containing insulating gas under positive pressure to assist in insulating the conductors, a tank containing such insulating gas under substantially higher pressure than that contained in the channel, a pipe receiving gas from the tank and conveying it to the channel, a regulator for reducing the pressure of the gas discharged by the tank into the pipe, a magnetically controlled valve in the pipe, one side of which is exposed to the pressure of the gas discharged by the regulator and on the other side to the pressure of the gas within the channel, said valve being normally closed, electric circuit wires connected to the magnet of the valve, a pressure actuated first switch acting on the magnet upon a predetermined decrease of pressure in a manner to cause the valve to open, a pressure actuated second switch also in the circuit acting on the magnet upon a predetermined increase of pressure in a manner to cause the valve to close in the event of failure of the first switch to operate, a first device responsive to a predetermined drop of pressure of gas in the channel for actuating the first switch in a manner to cause the valve to open, and a second device responsive to a predetermined increase of pressure of gas in the channel for actuating the second switch in a manner to cause the valve to close upon the failure of the first switch to operate.

3. A cable system comprising a cable containing insulating gas under positive pressure, a tank containing gas under a pressure greater than that in the cable, a conduit receiving gas from the tank and discharging it into the cable, a regulator in the conduit for reducing the pressure of the gas admitted to the cable, a normally closed shut-off valve in the conduit, an actuator for opening and closing the valve, a first means responsive to a decrease below normal of the pressure of the gas in the cable for normally causing the actuator to open the valve and admit gas to the cable and to cause the actuator upon a restoration of said pressure to close the valve, and a second means responsive to a pressure of gas within the cable higher than normal which assumes control of the valve actuator to the exclusion of the first means and causes the valve to shut.

4. A cable system comprising cable containing insulating gas under a pressure above that of the atmosphere, a means containing a large amount of gas under a pressure superior to that in the cable, a conduit receiving gas from the means and supplying it to the cable, a regulator in the conduit between the means and the cable for reducing the pressure of the gas flowing therefrom to the predetermined cable pressure, a magnetically controlled valve in the conduit on the cable side of the regulator which is normally closed, an electrical circuit therefor, a first switch in the circuit movable in response to predetermined changes of cable pressure to cause the magnet to open and close the valve under normal working conditions, and a second switch acting upon an abnormal increase of pressure in the cable to assume control of the magnet to the exclusion of the first switch and cause the valve to close and an alarm to be given.

5. A cable system comprising a cable containing insulating gas under a pressure above that of the atmosphere, a tank containing gas under a higher pressure than that in the cable, a conduit for conveying gas from the tank to the cable, a regulator in the conduit between the tank and cable for reducing the pressure of the gas to a predetermined value before its admission to the cable, a valve in the conduit on the cable side of the regulator which is closed when the cable pressure is normal, a controlling magnet for the valve, an electric circuit for the magnet, first and second switches in the circuit of the magnet, a first device responsive to cable pressure and calibrated to actuate the first switch to modify the circuit of the magnet and cause the valve to open when the cable pressure falls before the predetermined minimum, and a second device also responsive to cable pressure and calibrated to actuate the second switch to render the first switch and magnet ineffective when the cable pressure exceeds the predetermined maximum value.

6. A cable system comprising a cable containing insulating gas under a pressure above that of the atmosphere, a tank containing a large amount of gas under a pressure superior to that in the cable, a conduit receiving gas from the tank and supplying it to the cable, a regulator in the conduit between the tank and the cable for reducing the pressure of the gas flowing therefrom to the predetermined cable pressure, a magnetically controlled valve in the conduit on the cable side of the regulator which is normally closed, an electric circuit for the magnet, a first switch in the circuit of the valve magnet responsive to a predetermined decrease of pressure in the cable to cause the valve to open, a resistance substantially equal to that of the valve magnet which is normally idle, a second switch in the circuit in series with the resistance which upon a predetermined increase of cable pressure or upon a failure of the first switch to open permits a flow of current through the resistance in shunt to the magnet and cause the valve to close, and actuating means for the switches responsive to cable pressure, one part thereof being calibrated to control the movements of the first switch and another part being calibrated to control the movement of the second switch and render the first switch ineffective.

STEPHEN ZYSK.